United States Patent
Iwai et al.

(10) Patent No.: US 8,749,955 B2
(45) Date of Patent: Jun. 10, 2014

(54) CAPACITOR

(71) Applicant: Panasonic Corporation, Osaka (JP)

(72) Inventors: Mitsuru Iwai, Osaka (JP); Hiroki Kamiguchi, Osaka (JP); Akiyoshi Oshima, Osaka (JP); Yuta Moriura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/009,328

(22) PCT Filed: Nov. 20, 2012

(86) PCT No.: PCT/JP2012/007442
§ 371 (c)(1),
(2), (4) Date: Jan. 6, 2014

(87) PCT Pub. No.: WO2013/080486
PCT Pub. Date: Jun. 6, 2013

(65) Prior Publication Data
US 2014/0133068 A1    May 15, 2014

(30) Foreign Application Priority Data

Nov. 29, 2011   (JP) .................................. 2011-259944
Apr. 4, 2012    (JP) .................................. 2012-085401

(51) Int. Cl.
*H01G 9/04*    (2006.01)
(52) U.S. Cl.
USPC ........... 361/532; 361/523; 361/525; 361/528; 361/529; 361/540
(58) Field of Classification Search
USPC ......... 361/532, 516–519, 523–525, 528–529, 361/536–540
See application file for complete search history.

(56) References Cited

U.S. PATENT DOCUMENTS 6,504,705 B2 * 1/2003 Shimada et al. ............... 361/528
6,519,137 B1 * 2/2003 Nitta et al. ..................... 361/525

(Continued)

FOREIGN PATENT DOCUMENTS

| EP | 2 306 475 A1 | 4/2011 |
| JP | 2003-045753 A | 2/2003 |
| JP | 2008-047755 A | 2/2008 |
| JP | 2008-053512 A | 3/2008 |
| WO | 2010-041387 A1 | 4/2010 |

OTHER PUBLICATIONS

International Search Report issued in International Application No. PCT/JP2012/007442 with Date of mailing Feb. 26, 2013.

*Primary Examiner* — Nguyen T Ha
(74) *Attorney, Agent, or Firm* — McDermott Will & Emery LLP (57) ABSTRACT

A capacitor comprising a capacitor element including a substrate having first and second faces, a porous first rough surface layer formed on the first face and having pores, a first inner conductive polymer layer formed in the pores, a first outer conductive polymer layer formed on the inner conductive polymer layer, a porous second rough surface layer formed on the second face and having pores, a second inner conductive polymer layer formed in the pores, a second outer conductive polymer layer formed on the second inner conductive polymer layer, and a dielectric layer formed on surfaces of the first and the second rough surface layer. A surface area of the second rough surface layer is smaller than that of the first rough surface layer. The second outer conductive polymer layer is thicker than the first outer conductive polymer layer. This structure enables to eliminate warpage of a capacitor element.

6 Claims, 4 Drawing Sheets

(56) References Cited

U.S. PATENT DOCUMENTS

| | | | |
|---|---|---|---|
| 7,760,489 B2 * | 7/2010 | Fujita et al. | 361/528 |
| 7,778,012 B2 * | 8/2010 | Fujimoto | 361/523 |
| 8,097,184 B2 * | 1/2012 | Yoshida et al. | 252/500 |
| 8,208,242 B2 * | 6/2012 | Kamiguchi et al. | 361/528 |
| 2011/0182003 A1 | 7/2011 | Oshima | |

* cited by examiner

CAPACITOR

RELATED APPLICATIONS

This application is the U.S. National Phase under 35 U.S.C. §371 of International Application No. PCT/JP2012/007442, filed on Nov. 20, 2012, which in turn claims the benefit of Japanese Application No. 2011-259944, filed on Nov. 29, 2011 and Japanese Application No. 2012-085401, filed Apr. 4, 2012, the disclosures of which Applications are incorporated by reference herein.

TECHNICAL FIELD

The present invention relates to capacitors having solid electrolyte of conductive polymer.

BACKGROUND ART

In line with increased use of high frequencies for electronic apparatuses, a capacitor, which is one of electronic components, is also ever more demanded to have good impedance characteristic in a high-frequency range. To satisfy this demand, various solid electrolytic capacitors using conductive polymer with high electric conductivity for their solid electrolyte have been examined.

Figure 5:
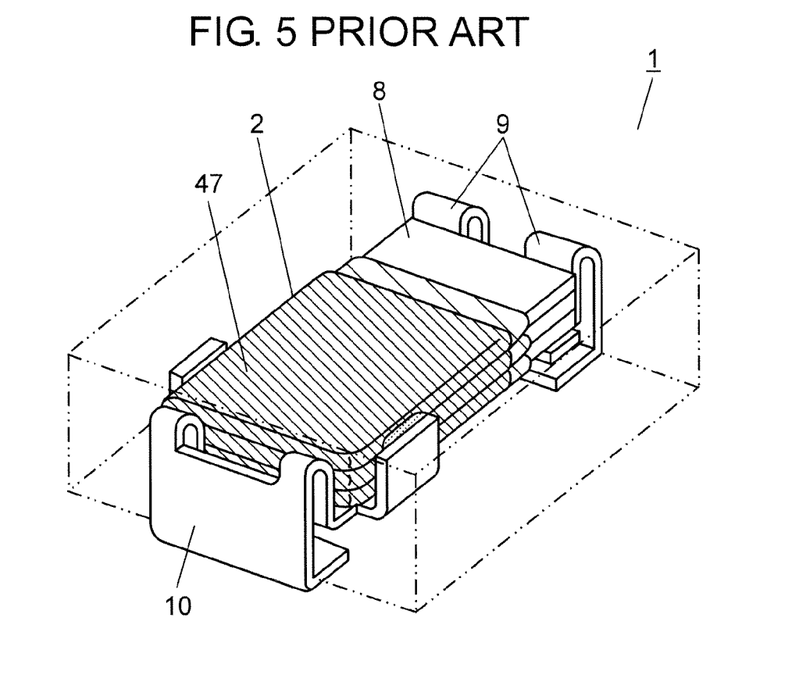
FIG. 5 is a perspective view of a conventional capacitor.
Figure 6:
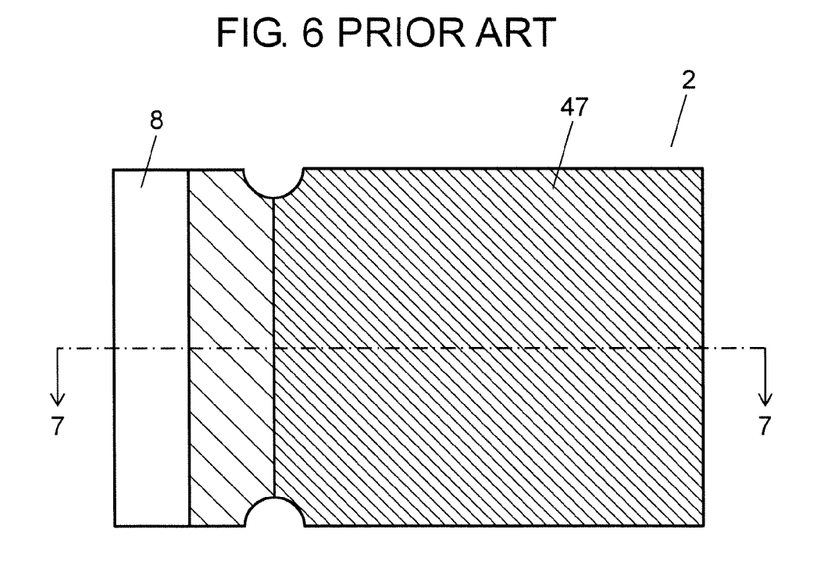
FIG. 6 is a plan view of a capacitor element of the conventional capacitor in FIG. 5.

FIG. 5 is a perspective view of capacitor 1 that is a conventional solid electrolytic capacitor. This capacitor 1 is made by laminating multiple capacitor elements 2 in FIG. 6.

Figure 7:
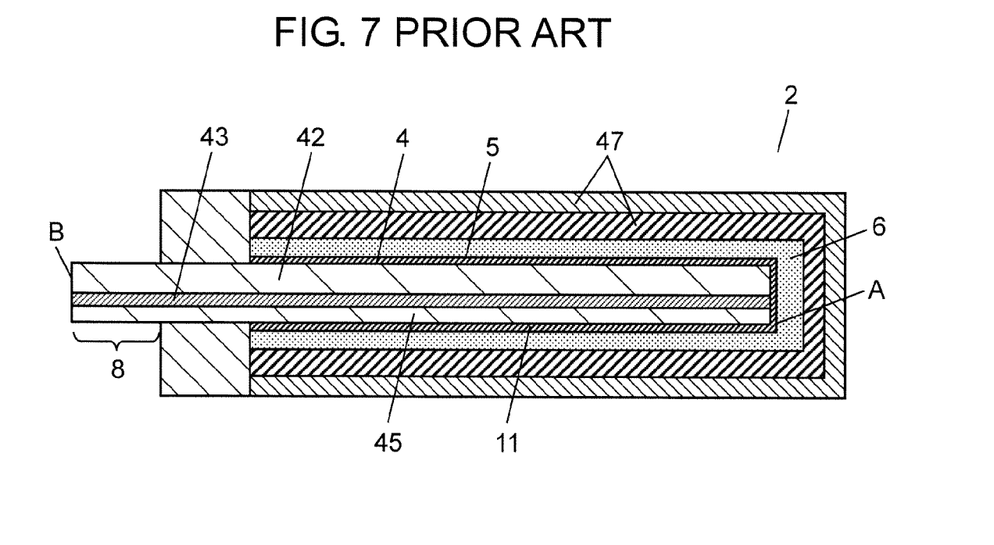
FIG. 7 is a sectional view of the capacitor element in FIG. 6, taken along line 7-7.

A method of manufacturing capacitor element 2 is described next. First, as shown in FIG. 7, dielectric film 4 is formed on both faces of substrate 43 made of aluminum. Next, a conductive film (not illustrated) is formed on dielectric film 4 on the side of one end (end A) of substrate 43. Then, a power supply part of a positive electrode is placed on one face (face 5) on the side of the other end (end B) of substrate 43. Conductive polymer layer 6 is formed on the dielectric film formed on the side of end A by soaking substrate 43 in a monomer solution and applying voltage. Next, negative electrode layer 47 is formed on this conductive polymer layer 6. By removing the power supply part, a face where conductive polymer layer 6 is not formed is exposed on the side of the other end (end B) of substrate 43. This becomes positive electrode 8. Capacitor element 2 is formed by the above steps.

Positive electrode 8 of each capacitor element 2 is led out to positive electrode terminal 9, and negative electrode layer 47 is led out to negative electrode terminal 10 in capacitor 1 shown in FIG. 5.

In conventional capacitor 1, rough surface layers 42 and 45 are formed by vacuum deposition on surfaces of electrode foil (substrate 43) made of aluminum foil on the side of one face 5 and on the side of the other face 11, respectively, in capacitor element 2 with the aim of increasing static capacitance by expanding a surface area per unit volume of substrate 43. Rough surface layer 42 on one face 5 is thicker than rough surface layer 45 on the other face 11.

CITATION LIST

Patent Literature

PTL1 WO 2010/041387

SUMMARY OF THE INVENTION

Figure 8:
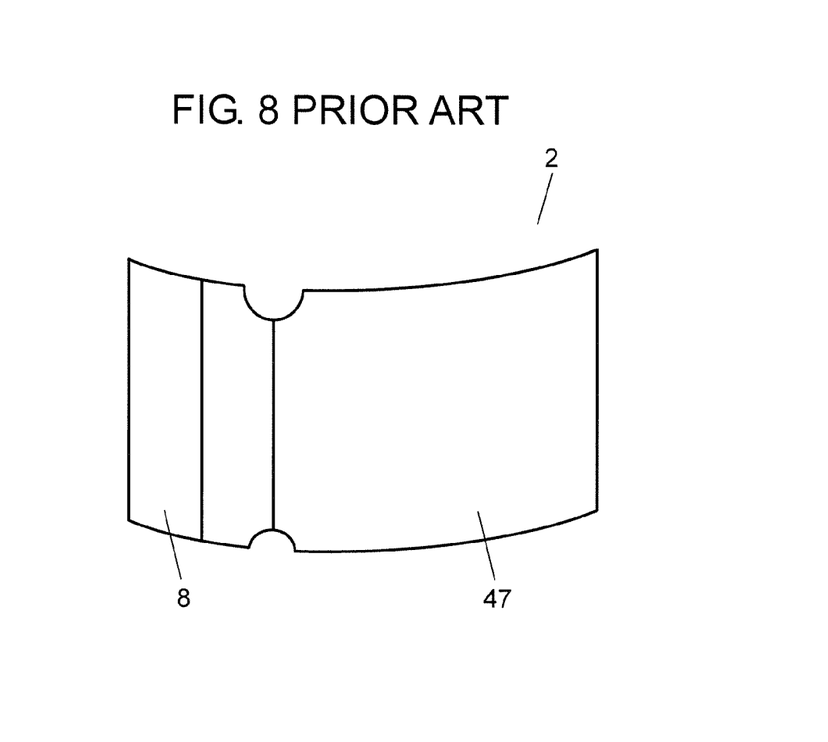
FIG. 8 is a perspective view illustrating warpage of the capacitor element.

When conductive polymer layer 6 is formed by electropolymerization, capacitor element 2 may deform, such as warping and bending, as shown in FIG. 8. If capacitor element 2 is warped, a crack occurs in conductive polymer layer 6. This increases equivalent series resistance (hereafter referred to as ESR).

The present invention thus aims to reduce deformation, such as warpage, of the capacitor element.

The present invention includes a substrate made of a valve metal and having a first face and a second face confronting each other, a porous first rough surface layer formed by depositing a valve metal on the first face and having pores on its outer surface and inside, a first inner conductive polymer layer formed in the pores of the first rough surface layer, a first outer conductive polymer layer formed on the outer surface of the first rough surface layer, a porous second rough surface layer formed by depositing a valve metal on the second face and having pores on its outer surface and inside, a second inner conductive polymer layer formed in the pores of the second rough surface layer, a second outer conductive polymer layer formed on the outer surface of the second rough surface layer, and a dielectric film formed on surfaces of the first rough surface layer and the second rough surface layer. A surface area of the second rough surface layer is smaller than a surface area of the first rough surface layer. The second outer conductive polymer layer is thicker than the first outer conductive polymer layer.

The above structure can reduce deformation, such as warpage, of the capacitor element. Conductive polymer adhered relatively less to inside the second rough surface layer that has smaller surface area, and more to inside the first rough surface layer that has larger surface area. In addition, by making the second outer conductive polymer layer thicker than the first outer conductive polymer layer, an amount of conductive polymer adhered to the first and second faces can be balanced. As a result, deformation, such as warpage, of the capacitor element due to thermal shrinkage can be reduced.

DESCRIPTION OF EMBODIMENTS

First Exemplary Embodiment

Figure 1:
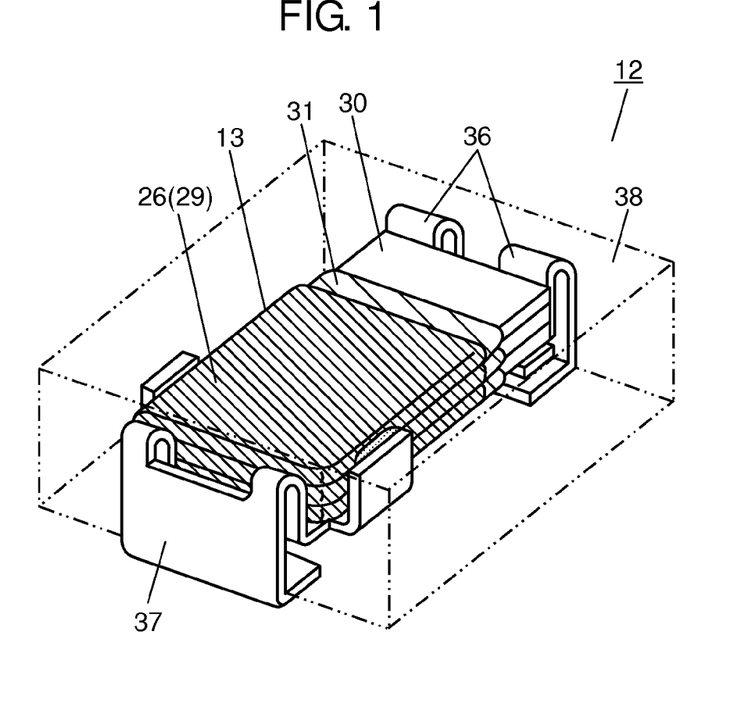
FIG. 1 is a perspective view of a capacitor in accordance with exemplary embodiments of the present invention.
Figure 2:
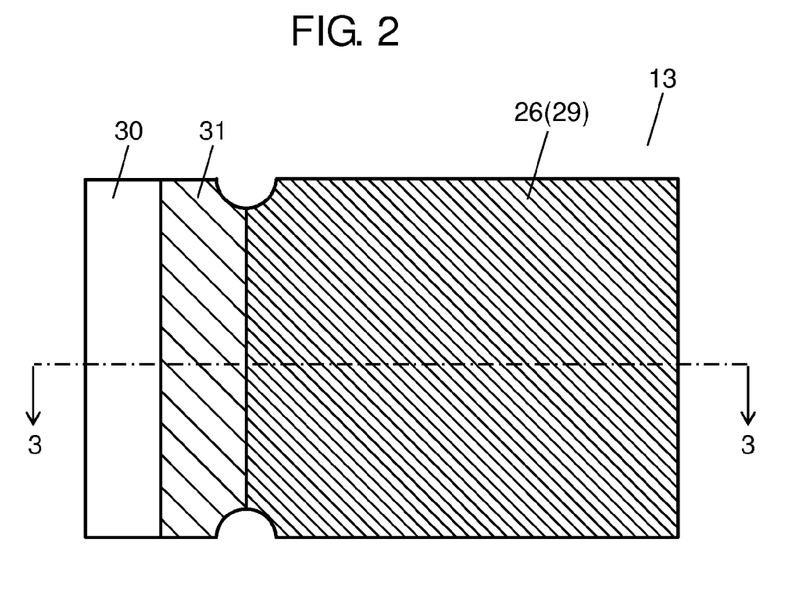
FIG. 2 is a plan view of a capacitor element of the capacitor in FIG. 1.
Figure 3:
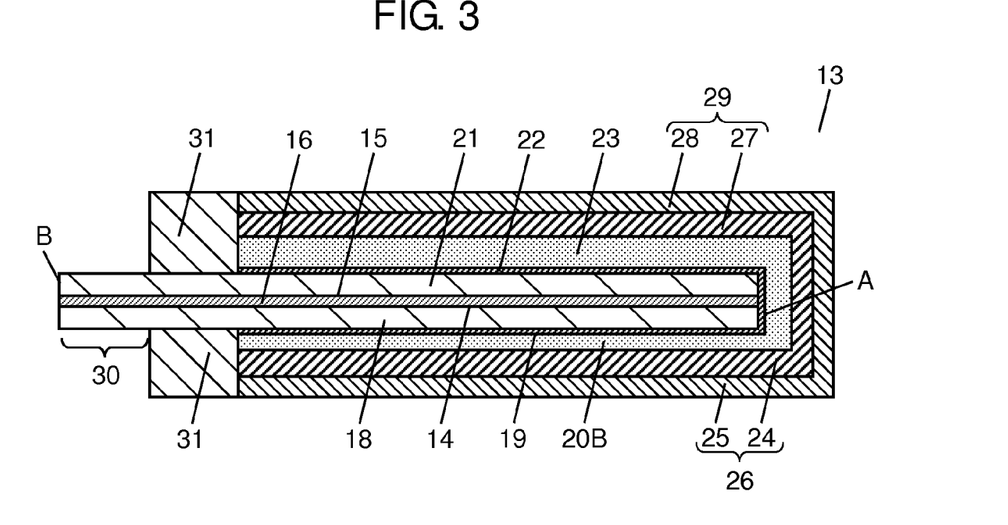
FIG. 3 is a sectional view of the capacitor element in FIG. 2, taken along line 3-3.
Figure 4:
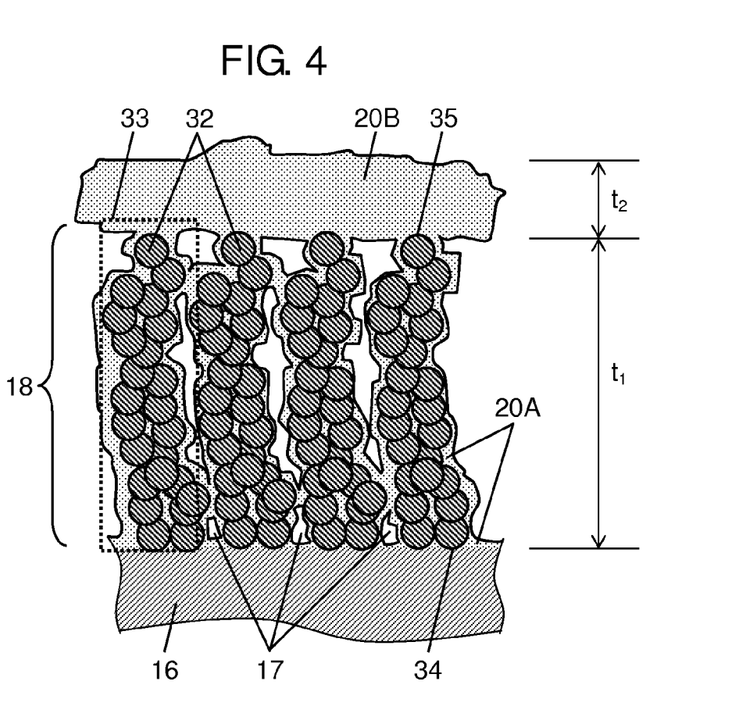
FIG. 4 is an enlarged sectional view of a main part of the capacitor element in FIG. 3.

The first exemplary embodiment is described with reference to FIGS. 1 to 4. The first exemplary embodiment is described using a laminated solid electrolytic capacitor as an example. FIG. 1 is a perspective view of capacitor 12. FIG. 2 is a plan view of capacitor element 13 of capacitor 12 in FIG. 1. FIG. 3 is a sectional view of capacitor element 13. FIG. 4 is an enlarged sectional view of a main part of the capacitor element. Capacitor element 12 in FIG. 1 is formed by laminating multiple plate capacitor elements 13 in FIG. 2.

A structure of capacitor element 13 is detailed below with reference to FIG. 3.

As shown in FIG. 3, substrate 16 has opposed first face 14 and second face 15, and is formed of a valve metal. First rough surface layer 18 is formed on first face 14 of substrate 16 by vacuum deposition. First rough surface layer 18 is porous, and has pores on its outer surface and inside. The pores in first rough surface layer 18 are formed from the inside leading to the outer surface.

First dielectric film 19 is formed on a surface of first rough surface layer 18, which is the porous outer surface and surfaces of pores inside. First outer conductive polymer layer 20B is formed on a surface of first dielectric film 19 formed on the outer surface of first rough surface layer 18, and covers the outer surface of first rough surface layer 18.

Although not illustrated in FIG. 3, a first inner conductive polymer layer (20A in FIG. 4) is formed in the pores inside first rough surface layer 18.

In the same way as first face 14, porous second rough surface layer 21, second dielectric film 22, second outer conductive polymer layer 23, and a second inner conductive polymer layer (not illustrated) are also formed on second face 15 of substrate 16.

Second outer conductive polymer layer 23 covers an outer surface of second rough surface layer 21, same as first outer conductive polymer layer 20B.

FIG. 3 is a schematic view, and thus first rough surface layer 18 and second rough surface layer 21 are illustrated in almost flat state as a whole. Details inside first rough surface layer 18 are described later with reference to FIG. 4.

Second rough surface layer 21 has a surface area smaller than first rough surface layer 18. The surface area of the rough surface layer is obtained by the product of a surface area per unit volume, thickness, and top projected area of the rough surface layer. In this exemplary embodiment, the surface area of second rough surface layer 21 is reduced by making the surface area per unit volume of second rough surface layer 21 smaller to achieve a denser film than that of first rough surface layer 18. In this exemplary embodiment, the surface area per unit volume is calculated based on a specific surface area using the BET method.

Also in this exemplary embodiment, second outer conductive polymer layer 23 is thicker than first outer conductive polymer layer 20B.

In addition, first negative electrode layer 26 including first carbon layer 24 and first silver paste layer 25, and second negative electrode layer 29 including second carbon layer 27 and second silver paste 28 are formed on surfaces of first outer conductive polymer layer 20B and second outer conductive polymer layer 23, respectively.

On the side of one end A of substrate 16, first inner conductive polymer layer (not illustrated) and first outer conductive polymer layer 20B are formed on first dielectric film 19 via a first conductive film (not illustrated). In the same way, the second inner conductive polymer layer (not illustrated) and second outer conductive polymer layer 23 are formed on second dielectric film 22 via a second conductive film (not illustrated). The first conductive film and the second conductive film are so-called precoat layers. They are formed to give conductivity to the surface of insulated substrate 16 for electro-polymerization.

On the side of the other end B of substrate 16, the conductive film and the inner and outer conductive polymer layers are not formed, and thus first dielectric film 19 and second dielectric film 22 are externally exposed. This end B becomes positive electrode 30 of capacitor element 13.

At a boundary of the end A side and the end B side of substrate 16, insulation 31 made of insulating resin or tape is formed on first dielectric film 19 and second dielectric film 22.

Next, the structure on the side of first face 14 is detailed with reference to FIG. 4. FIG. 4 is an enlarged sectional view of a main part of the capacitor element in FIG. 3. Illustration in FIG. 4 is upside down of that in FIG. 3. The structure on the side of second face 15 is same as the structure on the side of first face 14.

As shown in FIG. 4, first rough surface layer 18 (same for second rough surface layer 21) is configured with many columnar members 33 arranged at a predetermined interval. Each of columnar members 33 is formed of valve metal fine particles 32, such as aluminum and titanium, piled up, and extending from substrate 16 to the outer surface. Adjacent valve metal fine particles 32, and valve metal fine particle 32 in contact with substrate 16 and substrate 16 are bonded to each other. In this exemplary embodiment, valve metal fine particles 32 are piled up in a branched manner, so as to disperse the stress. This increases the mechanical strength of columnar members 33.

The particle diameter of valve metal fine particles 32 configuring first rough surface layer 18 and second rough surface layer 21 is 0.01 μm or more and 0.2 μm or less on average. The particle diameter of valve metal fine particles 32 can be calculated by observing a cross section of electrode foil, using SEM (scanning electron microscope).

A point that differs between the side of first face 14 and the side of second face 15 is that valve metal fine particles 32 configuring second rough surface layer 21 (indicated in FIG. 3) have a larger average particle diameter than that of valve metal fine particles 32 configuring first rough surface layer 18 in the above range.

First inner conductive polymer layer 20a in FIG. 4 and the second inner conductive polymer layer (not illustrated) are the conductive polymer layers adhered to the exposed face of substrate 16 and a side face of pillar member 33. A part or all of pores 17 may be filled with the first and second inner conductive polymer layers.

Porosity per unit volume of first rough surface layer 18 and second rough surface layer 21 before forming aforementioned first inner conductive polymer layer 20A and the second inner conductive polymer layer is 50% or more and 80% or less.

The surface areas per unit volume of first rough surface layer 18 and second rough surface layer 21 are preferably $5 \times 10^4$ cm$^2$/cm$^3$ or more and $30 \times 10^4$ cm$^2$/cm$^3$ or less, respectively, based on the specific surface area using the BET method. This can enlarge the surface areas of first rough surface layer 18 and second rough surface layer 21, and also increases coverage of first inner conductive polymer layer 20A and second inner conductive polymer layer. Accordingly large capacitance can be achieved.

In this exemplary embodiment, second rough surface layer 21 is a denser film, which means it has a smaller surface area per unit volume, than that of first rough surface layer 18.

In addition, thicknesses of first rough surface layer 18 and second rough surface layer 21 are preferably 5 μm or more and 50 μm or less. In the exemplary embodiment, they have the same thickness.

Furthermore, forming regions, which are top projected areas, of first rough surface layer 18 and second rough surface layer 21 on substrate 16 are the same.

As described above, second rough surface layer 21 is denser than first rough surface layer 18, and has smaller surface area, even though the film thickness is same, in the exemplary embodiment.

When a ratio of the surface area of second rough surface layer 21 to the surface area of first rough surface layer 18 is the surface area ratio of rough surface layers, the surface area ratio of rough surface layers is preferably 1.05 or more and 2.0 or less. This reduces degradation due to the heat of vacuum deposition, and achieves a reliable surface area, gaining large capacitance. More preferably, the surface area ratio of rough surface layers is 1.05 or more and 1.5 or less.

The thickness of second outer conductive polymer layer 23 is set thicker than first outer conductive polymer layer 20B.

When a ratio of a thickness of first outer conductive polymer layer 20B to a thickness of second outer conductive polymer layer 23 is the thickness ratio of outer conductive polymer layers, the thickness ratio of outer conductive polymer layers is preferably 1.05 or more and 3.5 or less. This can drastically reduce warpage of the capacitor element due to thermal shrinkage. When the surface area ratio of rough surface layers is 1.05 or more and 1.2 or less, the thickness ratio of outer conductive polymer layers is preferably 1.05 or more and 1.5 or less.

When the surface area ratio of rough surface layers is 1.2 or more and 1.5 or less, the thickness ratio of outer conductive polymer layers is preferably 1.1 or more and 2.5 or less.

In this exemplary embodiment, thicknesses of first rough surface layer 18 and second rough surface layer 21 are, as shown in FIG. 4, an average of length t1 from base 34 of columnar member 33 (a boundary face with substrate 16) to tip 35 of columnar member 33. The thicknesses of first outer conductive polymer layer 20B and second outer conductive polymer layer 23 are an average of length t2 from tip 35 of columnar member 33 to the outer surfaces of first outer conductive polymer layer 20B and second outer conductive polymer layer 23 (a boundary face with first negative electrode layer 26 and second negative electrode layer 29), respectively. Since first dielectric film 19, second dielectric film 22, and the first and second conductive films are relatively extremely thin, their thicknesses can be ignored.

Above capacitor elements 13 are laminated, and each of positive electrodes 30 is led out to positive electrode terminal 36 of capacitor 12 shown in FIG. 1. First negative electrode layer 26 and second negative electrode layer 29 are led to negative electrode terminal 37. Capacitor element 13 is covered with encapsulating resin 38 or external case, except for a part of positive electrode terminal 36 and negative electrode terminal 37.

Substrate 16 used in capacitor element 13 is made of a range of valve metal materials, such as aluminum and titanium, or their alloy materials. Thickness of substrate 16 is around 30 μm to 80 μm.

First dielectric film 19 and second dielectric film 22 are typically formed of aluminum oxide, titanium oxide, aluminum nitride, or titanium nitride.

<Manufacturing Method of Capacitor Element>

Next is described the manufacturing method of capacitor element 13 in the exemplary embodiment.

First, substrate 16 shown in FIGS. 3 and 4 is placed in a deposition chamber retained in the vacuum state of 0.01 Pa to 0.001 Pa. Next, mixed gas of oxygen gas and inactive gas is supplied around substrate 16 to retain the pressure of 10 Pa to 30 Pa around substrate 16, and the temperature of substrate 16 is maintained in a range of 150° C. to 300° C. In this state, aluminum material is provided in the deposition chamber as a deposition source. Aluminum is vacuum-deposited on first face 14 and second face 15 of substrate 16 to form first rough surface layer 18 and second rough surface layer 21 formed of aluminum fine particles (valve metal fine particles 32).

First rough surface layer 18 and second rough surface layer 21 may be formed simultaneously or separately. Second rough surface layer 21 becomes a dense film with its surface area per unit volume smaller than that of first rough surface layer 18 by changing deposition conditions (substrate 16, ambient temperature, and pressure) and sequence of deposition procedures in a process of forming first rough surface layer 18 and a process of forming second rough surface layer 21.

In addition, a defect in the entire rough surface layers can be suppressed by forming second rough surface layer 21 before first rough surface layer 18. This is because an average particle diameter of valve metal fine particles 32 in second rough surface layer 21 is larger than that of first rough surface layer 18, and thus the mechanical strength improves. Accordingly, after forming second rough surface layer 21, for example, a defect unlikely occurs at winding up, typically using a roll, or folding operation.

Next, substrate 16 is soaked in a solution at 70° C. containing 7% ammonium adipate. Chemical conversion treatment takes place by applying formation voltage of 5V and formation current of 0.05 A/cm2 for 20 minutes. An oxide film is formed on an exposed face of substrate 16 and surfaces of first and second rough surface layers 18 and 21. The oxide film on first rough surface layer 18 becomes first dielectric film 19 shown in FIG. 3, and the oxide film on second rough surface layer 21 becomes second dielectric film 22. First dielectric film 19 and second dielectric film 22 are extremely thin, and thus they are not illustrated in FIG. 4.

First dielectric film 19 and second dielectric film 22 may be formed by anodization. They may also be formed using a range of methods including vacuum deposition, plating, and sol-gel process.

Next, insulation 31 shown in FIG. 3 is formed such that insulation 31 presses first dielectric film 19 and second dielectric film. The first conductive film and the second conductive film are formed only on one side (toward end A) from insulation 31. The first conductive film and second conductive film can be formed of conductive polymer, such as polyaniline, polythiophene, and polypyrrole.

Next, a power supply part for the positive electrode is attached onto positive electrode 30 on the other side (toward end B) of insulation 31. The power supply part for the positive electrode may be provided on insulation 31. A power supply part for the negative electrode is provided without contacting capacitor element 13. In the exemplary embodiment, a metal adhesive tape is used for the power supply part for the positive electrode. Then, entire capacitor element 13 is soaked in a monomer solution, and electric voltage is applied while retaining a predetermined temperature. This causes electro-polymerization, and the first inner conductive polymer layer, the second inner conductive polymer layer, first outer conductive polymer layer 20B and second outer conductive polymer layer 23 are formed on the first conductive film and the second conductive film, respectively.

Here, the second conductive polymer is first formed by electro-polymerization, and then formation of the first conductive polymer starts in the middle of forming the second conductive polymer. Then, electro-polymerization continues to simultaneously form the first conductive polymer and the second conductive polymer. By electro-polymerization, the second inner conductive polymer layer is first formed on inner walls of pores 17 in second rough surface layer 21. Then, second outer conductive polymer layer 23 is formed such that it covers tips 35 of columnar members 33 configuring second rough surface layer 21.

In the same way, the first inner conductive polymer layer (20A in FIG. 4) is formed to fill pores 17 formed in first rough surface layer 18. Furthermore, first outer conductive polymer layer 20B is formed such that it covers tips 35 of columnar members 33.

In the above electro-polymerization process, second outer conductive polymer layer 23 formed on the second conductive film can be made thicker by setting longer polymerization time than that of first outer conductive polymer layer 20B formed on the first conductive film.

In the exemplary embodiment, a solution containing monomer, such as thiophene, aniline, and pyrrole, and dopant, such as polystyrene sulfonate and naphthalane sulfonate, is used as a monomer solution.

Then, the power supply tape is peeled off, and first negative electrode layer 26 and second negative electrode layer 29 are formed on first outer conductive polymer layer 20B and second outer conductive polymer layer 23, respectively, to complete capacitor element 13 in the exemplary embodiment.

Capacitor element 13 is heated in the above electro-polymerization process, and then cooled.

Since the surface area of first rough surface layer 18 is large in the exemplary embodiment, the total volume of first inner conductive polymer layer 20A adhered to first rough surface layer also becomes large, but thin first outer conductive polymer layer 20B is formed on first rough surface layer 18. On the other hand, since the surface area of second rough surface 21 is small, the total volume of the inner conductive polymer layer adhered to the second rough surface layer also becomes small, but thick second outer conductive polymer layer 23 is formed on second rough surface layer 21.

Accordingly, the total volume of conductive polymer contained in first face 14 of substrate 16 and the total volume of conductive polymer contained in second face 15 are close, and thus thermal shrinkage of capacitor element 13 on the side of first face 14 and the side of second face 15 of substrate 16 can be balanced. In other words, although thermal shrinkage of conductive polymer is greater than the rough surface layer made of a valve metal, the same amount of polymer can be provided on first face 14 and second face 15. This can reduce a difference in thermal shrinkage between the side of first face 14 and the side of second face 15 of capacitor element 13.

In the exemplary embodiment, the surface area per unit volume of second rough surface layer 21 is set smaller to achieve a surface area smaller than the surface area of first rough surface layer 18. Other than this, the surface area can be reduced by thinning second rough surface layer 21 or reducing the formation area of second rough surface layer 21 on substrate 16.

When second rough surface layer 21 is made thinner than first rough surface layer 18, frequency of occurrence of peeling can be reduced between valve metal fine particles 32 in second rough surface layer 21 because second rough surface layer 21 is thin. In other words, a defect in second rough surface layer 21 can be reduced. Accordingly, by forming first rough surface layer 18 after forming second rough surface layer 21, a defect on the entire rough surface layers can be suppressed.

<Comparison of Warpage>

To explain warpage in the exemplary embodiment, Example and Comparison are described below.

Example uses an aluminum foil of 0.03 mm thick×4.0 mm long×3.0 mm wide for the substrate. The first rough surface layer has the surface area per unit volume of $15 \times 10^4$ $cm^2/cm^3$ and thickness of 40 μm. The second rough surface layer has the surface area per unit volume of $10 \times 10^4$ $cm^2/cm^3$ and thickness of 40 μm, which is the same with the first rough surface layer. Using polypyrrole conductive polymer, the first outer conductive polymer layer is set to 10 μm thick and the second outer conductive polymer layer is set to 20 μm thick to form the capacitor element. Warpage of this capacitor element is 0.05 mm.

In Comparison, the outer conductive polymer layers have the same thickness. Other points are same as that of Example. The first outer conductive polymer layer and the second outer conductive polymer layer are 10 μm thick. Warpage of this capacitor element is 0.30 mm.

It is apparent that the capacitor element greatly warps in Comparison, as shown in FIG. 8. If the capacitor element is warped, a crack occurs in the conductive polymer layer, and ESR increases. Or, a space is created between the capacitor elements at laminating the capacitor elements. This increases resistance.

Contrarily, Example can reduce a difference in an amount of conductive polymer on both faces of substrate 16. Warpage of the capacitor element can thus be reduced to 0.1 mm or less.

Second Exemplary Embodiment

The second exemplary embodiment is described with reference to FIGS. 3 and 4.

This exemplary embodiment differs from the first exemplary embodiment with respect to thicknesses of first rough surface layer 18 and second rough surface layer 21. Other structure is same as that of the first exemplary embodiment, and thus their description is omitted. The thicknesses of first rough surface layer 18 and second rough surface layer 21 refer to an average of length t1 from base 34 (a boundary with substrate 16) of columnar member 33 to tip 35 of columnar member 33.

In the exemplary embodiment, second rough surface layer 21 is thinner than first rough surface layer 18.

When a ratio of a thickness of second rough surface layer 21 to thickness of first rough surface layer 18 is a thickness ratio of rough surface layers, the thickness ratio of rough surface layers is preferably 1.05 or more and 2.0 or less. More preferably, the thickness ratio of rough surface layer is 1.05 or more and 1.5 or less. This reduces degradation due to the heat of vacuum deposition, and ensures reliable surface area. Accordingly, large capacitance is achievable.

Also in this exemplary embodiment, second rough surface layer 21 has smaller surface area per unit volume than that of first rough surface layer 18, which is the same as in the first exemplary embodiment.

However, second rough surface layer 21 may have the same surface area per unit volume with first rough surface layer 18.

As described above, also in this exemplary embodiment, second rough surface layer 21 has smaller surface area than that of first rough surface layer.

This can reduce an amount of conductive polymer entering inside second rough surface layer 21 in this exemplary embodiment. Accordingly, although second outer conductive polymer layer 23 becomes thick, a difference in the amount of conductive polymer on both faces of substrate 16 can be reduced, and thus warpage of capacitor element 13 can be reduced.

In the process of forming second rough surface layer 21, second rough surface layer 21 can be made thinner than first rough surface layer 18 by shortening the deposition time or reducing the amount of deposition source compared to that in the process of forming the first rough surface layer 18.

In addition, since second rough surface layer 21 is denser and thinner than first rough surface layer 18, there is less frequency of peeling between valve metal fine particles 32. Accordingly, a defect in the entire rough surface layer can be suppressed by forming first rough surface layer 18 after forming second rough surface layer 21.

Other structures and effects are the same as the first exemplary embodiment, and thus their description is omitted.

The first and second exemplary embodiments refer to a laminated solid electrolytic capacitor as an example of capacitor 12. However, for example, capacitor 12 may be a wound solid electrolytic capacitor. Also in the wound capacitor, ESR can be reduced by suppressing deformation of the capacitor element. Furthermore, capacitor 12 may be a so-called hybrid electrolytic capacitor, in which both solid electrolyte and electrolytic solution are used.

INDUSTRIAL APPLICABILITY

The capacitor element of the present invention shows less warpage due to thermal shrinkage, and thus is effectively applicable to solid electrolytic capacitors requiring low ESR characteristic.

The invention claimed is:

1. A capacitor comprising:
 a substrate made of a valve metal, and having a first face and a second face confronting each other;
 a porous first rough surface layer formed by depositing a valve metal on the first face and having pores on its outer surface and inside;
 a first inner conductive polymer layer formed in the pores of the first rough surface layer;
 a first outer conductive polymer layer formed on the outer surface of the first rough surface layer;
 a second rough surface layer formed by depositing a valve metal on the second face and having pores on its outer surface and inside;
 a second inner conductive polymer layer formed in the pores of the second rough surface layer;
 a second outer conductive polymer layer formed on the outer surface of the second rough surface layer; and
 a dielectric film formed on a surface of the first rough surface layer and a surface of the second rough surface layer,
 wherein
 a surface area of the second rough surface layer is smaller than a surface area of the first rough surface layer, and
 the second outer conductive polymer layer is thicker than the first outer conductive polymer layer.

2. The capacitor of claim 1,
 wherein
 a surface area per unit volume of the second rough surface layer is smaller than a surface area per unit volume of the first rough surface layer.

3. The capacitor of claim 1,
 wherein
 the second rough surface layer is thinner than the first rough surface layer.

4. The capacitor of claim 1,
 wherein
 a ratio of the surface area of the second rough surface layer to the surface area of the first rough surface layer is not less than 1.05 and not greater than 2.0.

5. The capacitor of claim 1,
 wherein
 a ratio of a thickness of the first outer conductive polymer layer to a thickness of the second outer conductive polymer layer is not less than 1.05 and not greater than 3.5.

6. The capacitor of claim 1,
 wherein
 the surface areas per unit volume of the first rough surface layer and the second rough surface layer are both not less than $5 \times 10^4$ cm$^2$/cm$^3$ and not greater than $30 \times 10^4$ cm$^2$/cm$^3$.

* * * * *